United States Patent [19]

King et al.

[11] 4,309,844
[45] Jan. 12, 1982

[54] PRODUCTION OF ARTIFICIAL GROWING MEDIUMS

[75] Inventors: David A. King; Sidney J. Vallans, both of Accrington, England

[73] Assignee: Caligen Foam Limited, Accrington, England

[21] Appl. No.: 111,740

[22] Filed: Jan. 14, 1980

[51] Int. Cl.³ .................................................. A01G 9/10;
[52] U.S. Cl. .............................................. 47/56; 47/74;
47/DIG. 7
[58] Field of Search .................. 47/56, 9, DIG. 9, 58,
47/DIG. 7, 74

[56] References Cited

U.S. PATENT DOCUMENTS

| 3,080,681 | 3/1963 | Merrill et al. | 47/56 |
| 3,257,754 | 6/1966 | Ohsol | 47/56 |
| 3,703,786 | 11/1972 | Swan | 47/56 |
| 3,812,618 | 5/1974 | Wood et al. | 47/56 |
| 3,834,072 | 9/1974 | Rack | 47/56 X |
| 3,889,417 | 6/1975 | Wood et al. | 47/56 X |
| 3,899,850 | 8/1975 | Glück et al. | 47/74 |

FOREIGN PATENT DOCUMENTS

| 2048925 | 4/1972 | Fed. Rep. of Germany | 47/56 |
| 1475994 | 6/1977 | United Kingdom | 47/56 |

Primary Examiner—Robert E. Bagwill
Attorney, Agent, or Firm—Alan H. Levine

[57] ABSTRACT

Process and apparatus for the production of a seeded artificial growth medium comprises continuously feeding a flexible carrier sheet which may comprise a non-woven fibrous material or a sheet of foamed plastics material, applying seeds to the upper surface of the continuously moving sheet, moving a sheet of flexible foamed plastics material in synchronism with the carrier sheet, bringing the sheet of foamed plastics material into juxtaposition with the upper surface of the carrier sheet after application of the seeds and continuously adhering the sheets together, preferably by flame lamination.

33 Claims, 1 Drawing Figure

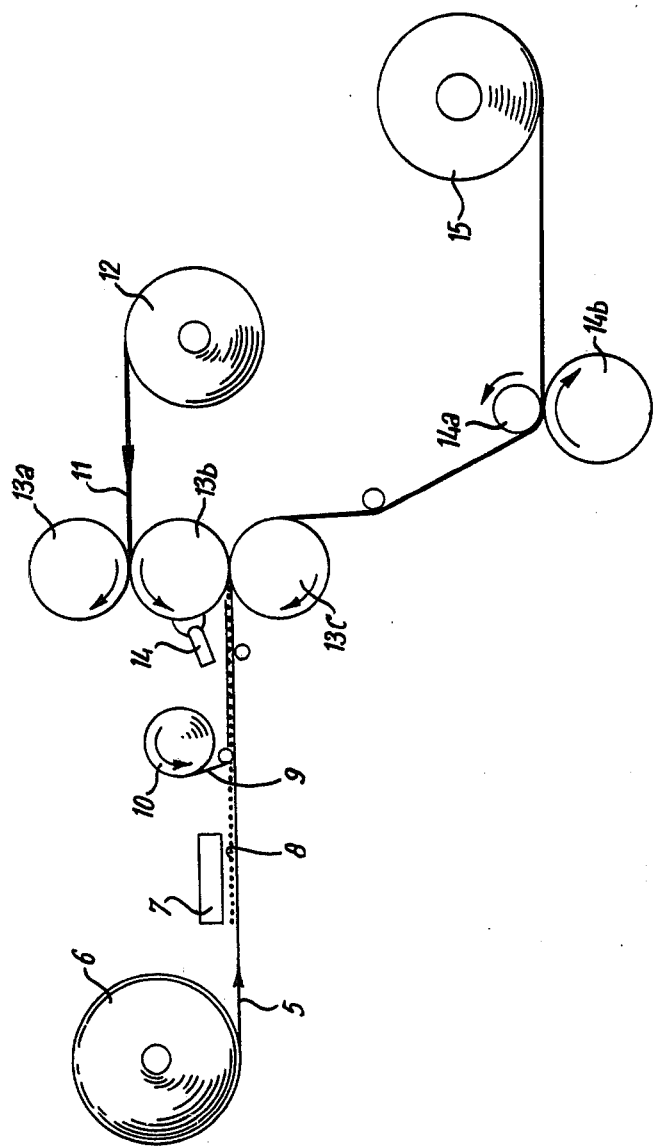

PRODUCTION OF ARTIFICIAL GROWING MEDIUMS

The invention relates to artificial growing mediums.

Various attempts have been made to produce artificial growing mediums, particularly, but not exclusively, for the cultivation of grass. Growing of grass by distributing seed on the ground produces very variable results due particularly to the removal of seed by birds, wind and other climatic factors, in addition to which it is difficult to distribute seed evenly over the ground, particularly when the ground is not level.

Previously proposed artificial growing mediums have generally suffered from the disadvantage that they interfere with germination of the seed, they cannot be readily and cheaply produced in commercial quantities or they are unsuitable for transportation or storage. In one previously proposed technique foamed plastics material is sprinkled with seed and maintained in a moistened condition to effect germination, following which the foam sheet, together with germinated seeds attached thereto by their root structures, is removed to the intended growth site. This technique suffers from the disadvantage that the seeds are unconnected to the foam prior to germination and the sheets cannot therefore be transported to the intended growth site until after germination. Consequently the sheets must be maintained in a moist condition during transportation and this severely limits the distances over which they can be transported and increases the weight of the sheet and hence the cost of transportation. Moreover a difficulty which arises with this and other forms of previously proposed artifical growing mediums is that they cannot be readily fixed to the ground in a secure manner.

It is an object of the present invention to obviate or mitigate at least some of the foregoing disadvantages.

According to one aspect of the invention there is provided a process for the production of a seeded artificial growth medium comprising continuously feeding a flexible carrier sheet, applying seeds to the upper surface of the continuously moving sheet, moving a sheet of flexible foamed plastics material in synchronism with said carrier sheet, bringing said sheet of foamed plastics material into juxtaposition with the upper surface of said carrier sheet after application of said seeds thereto, and continuously adhering the sheets together.

Preferably said sheets are fused together by flame lamination. In order to avoid damage to the seeds the flame is preferably brought into contact with the surface of said foam plastics sheet before the latter is brought into juxtaposition with the carrier sheet.

The carrier sheet may comprise a non-woven fibrous material but preferably comprises a sheet of foamed plastics material. The foamed plastics material constituting the upper sheet and, where appropriate, the carrier sheet is preferably an opened-celled foam.

Preferably a reinforcing material in the form of a net-like structure is incorporated between the two sheets of material. The reinforcing material may comprise a net formed from synthetic plastics material and of a mesh size sufficiently large to permit the sheet materials to contact one another between the meshes of the net to retain the integrity of the bond therebetween.

According to a further aspect of the invention there is provided apparatus for the production of an artificial growing medium containing seed, the apparatus including means for continuously feeding a carrier sheet of flexible material, means for applying seeds to the surface of the carrier sheet, means for continuously feeding a sheet of flexible foamed plastics material and for bringing same into juxtaposition with the seeded surface of said carrier sheet, and means for continuously adhering the sheets to one another by fusion.

Preferably said means for adhering the sheets to one another comprises a burner tube extending transversely of the direction of movement of the sheets and serving to direct a flame on to the surface of at least one of said sheets to render said surface tacky, and means for pressing the sheets together after application of said flame thereto.

Preferably the apparatus also includes means for introducing a reinforcing material of net-like structure between said sheets prior to adhering same to one another.

Preferably also said means for delivering seeds on to said carrier sheet comprises a vibratory conveyor device disposed above said carrier sheet and having a discharge opening extending across the width of the carrier sheet.

The invention also provides a seeded growing medium comprising a pair of sheets of flexible material at least one of which comprises a foamed plastics material, the sheets having seeds entrapped between them and having been adhered together by fusion.

Preferably both said sheets comprise open-celled foamed plastics material and are fused together by flame lamination. The foamed plastics material is preferably polyurethane foam.

Preferably also a reinforcing material comprising a net-like structure is incorporated between the two sheets. The reinforcing material preferably comprises an open mesh structure formed from synthetic yarn.

An embodiment and examples of the invention will now be described, by way of example only, with reference to the accompanying drawing, which is a diagrammatic cross-section through one form of apparatus for producing a seeded artificial growing medium according to the invention.

Referring to the drawing, a base or carrier sheet 5 comprising polyurethane foam is drawn from a reel 6 beneath a vibratory conveyor device 7 which extends across the sheet 5 and deposits seeds 8 on the upper surface of the sheet in a uniformly dispersed manner. After application of the seeds a reinforcing material in the form of a net-like structure 9 constructed from synthetic fibres is drawn from a roll 10 and applied to the upper surface of the seeded carrier sheet 5. A further sheet 11 of polyurethane foam is drawn from a supply roll 12 through nip rollers 13a, 13b and heated by a flame applied to the surface of the sheet from a burner 14 which extends across the full width of the sheet, the sheet 11 then being pressed into contact with the carrier sheet 5 between nip rollers 13b and 13c. The burner 14 is tilted upwards at an angle of about 30° to the horizontal in order to prevent scorching of the seed supported on the carrier sheet 5. As a result of application of the flame to the sheet 11 the surface of the foam is melted so that it becomes tacky and adheres to the adjacent surface of the carrier sheets 5 when the sheets are brought into contact. The laminated product consisting of the carrier sheet 5, seeds 8, reinforcing net 9 and upper sheet 11 passes between secondary nip rollers 14a, 14b and is wound on to a take-up roll 15.

While the preferred material for the sheets 5 and 11 is polyurethane foam, other foamed plastics material could be used and in some cases the carrier sheet 5 may comprise a material other than a foamed plastics material, for example a non-woven fibrous material. The thickness of the polyurethane foam sheets may vary considerably depending on requirements but in general will be as thin as possible consistent with sufficient strength to resist tearing or disintegration during storage or transport. Foam thicknesses between 0.5 and 15 mm. may be used but thicknesses of 1.0-2.5 mm. are preferred. For most applications thin foams will be used to reduce the quantity of material utilised and hence the cost, but in cases where it is necessary for the product to retain moisture or to prevent evaporation of moisture from soil on which the product is laid in use, thicker foams may be preferable. Thin foams are also desirable where broad leaf weeds are likely to be encountered since if the weeds cannot break through the foam they will lift it clear of the ground and prevent proper growth of the surrounding seeds. It is not essential that both sheets should be the same thickness and generally the sheet which is uppermost in use will be thinner than the lower sheet since the roots of the germinating seeds can penetrate the sheets more easily than the shoots. Where the carrier sheet is a non-woven fibrous material the product is preferably used with the fibrous material beneath the seeds for a similar reason.

The speed of travel of the sheets during lamination and the temperature of the flame applied may be varied considerably dependent upon requirements. In general using polyurethane foams having thicknesses of the order referred to above, a speed of travel of the order of 50 yards per minute would be utilised. If the speed of travel is too low the rise in temperature of the foam arising from impingement of the flame is such that the seeds are scorched during lamination. The speed of travel may of course be varied considerably if the flame temperature is adjusted accordingly and speeds of 30 yards per minute or less could be used depending on flame temperature and other factors. In general flame temperatures of the order of 1100°-1250° C. will be used.

The quantity of speed applied to the carrier sheet may be varied as required dependant on the nature of the seed, its germination rate and other factors. In the case of rye grass seed a distribution rate of two ounces per square yard has been found to produce satisfactory results. In some instances fertilisers or the like may be incorporated in the product but generally application of fertiliser will be affected after the product is in use in the same manner as for seeds planted conventionally.

The cell size of the foam may be varied considerably dependant on the size of the seeds concerned, the shoot and root diameters and the thickness of the foam. In general the cell size must be such that the seeds will not fall through the foam but subject to this requirement the cells are preferably as large as possible to offer minimum resistance to growth of the plants through the upper foam layer. Cell sizes of between 20 cells/in. and 60 cells/in. may be used, 25-35 cells/in. being more suited to coarse seeds such as rye grass and 30-60 cells/in. for finer seeds. The density of the foam may vary but is preferably of the order of 15-35 kg/m$^3$.

The reinforcing net-like material is preferably of relatively large mesh and formed from synthetic yarns fused, knitted or otherwise formed into a net-like structure. The net serves the function of reinforcing the laminated product and in addition enables it to be securely pegged or similarly secured to the ground in use. The provision of the net-like structure is not essential but if it is not provided the strength of the laminated product is reduced and problems can arise in securing it satisfactorily in its position of use. The net-like material could be formed from any suitable fibrous or strand-like material and particularly from natural or synthetic yarns. The mesh size of the net-like reinforcement material may vary considerably dependant on the nature and thickness of the sheets, the size and distribution of the seeds and other factors. In general however the net must be of sufficiently large mesh size to enable the sheets to contact one another and bond securely together at the mesh openings. Where the bottom sheet material is a non-woven fabric the reinforcing net may be omitted if the fabric itself has sufficient strength. The reinforcing net may be applied to the carrier sheet either before or after the seed is applied and is held in position between the upper and lower sheets after these have been bonded together.

The following examples are illustrative of various embodiments of the invention:

EXAMPLE 1

Grass seed (variety—Certified S23 Perennial Ryegrass) was dispersed at a density of 1 oz/yd$^2$ on to the surface of 1.4 mm. thick polyester urethane foam having 45 cells/linear inch. This operation was performed while the foam was moving at a speed of 50 yd/min. into the nip gap of a flame laminating machine. The coated foam was contacted with a second polyester urethane foam 2 mm. thick having 45 cells/linear inch whose surface had been rendered tacky by passing it across a gas burner with a flame temperature of 1150° C. This operation was performed using a burner tilted upwards at an angle of 30° to the horizontal foam carrying grass seed. The resultant product was one in which grass seed was dispersed uniformly between the two foams which were permanently bonded together such that it was impossible to separate the two foam layers even after a prolonged soaking in water. The laminated material showed a germination rate in excess of 90% after 20 days growth compared with a 90% germination rate for unlaminated grass seed.

EXAMPLE 2

Grass seed (variety—Certified S23 Perennial Ryegrass) was dispersed at a density of 1.8 oz/yd$^2$ on to the surface of a polyester urethane foam 1.25 mm. thick having 25 cells/linear inch and the coated product was supplied continuously at a rate of 50 yd/min. into the nip of a flame lamination machine. At this point the coated foam was contacted with a second polyester urethane foam 1.0 mm. thick having 25 cells/linear inch whose surface had been rendered tacky by passing it through a gas flame at a temperature of 1150° C. To avoid thermal damage to the grass seed the gas burner was again angled upwards at 30° to the horizontal. In this example, however, immediately prior to contact between the two foams a reinforcing interlayer consisting of extruded oriented polypropylene net having 60 strands/linear meter was incorporated in a continuous manner. The resultant product was again so strongly bonded that it was impossible to separate the laminated foam layers. The germination rate of seed after 20 days' growth again exceeded 90%.

EXAMPLE 3

Example 2 was repeated except that the grass seed variety was Certified Melle Perennial Ryegrass of density 2.1 oz/yd$^2$. The germination rate after 20 days' growth exceeded 90%.

EXAMPLE 4

Example 2 was repeated except that the grass seed variety was Certified Theodor Roemer Creeping Red Fescue—a salt tolerant material at a density of 1.7 oz/yd$^2$. The germination rate after 20 days was 80%—duplicating that of unlaminated seed.

EXAMPLE 5

Example 4 was repeated except that the reinforcing interlayer was a woven high density polyethylene net having 160 strands/linear meter. Similar results were achieved.

EXAMPLE 6

A finely divided grass seed (certified Highland Bent) was dispersed at a density of 1.2 oz/yd$^2$ on to the surface of a polyester urethane foam 0.75 mm. thick having 50 cells/in. The coated product was supplied in a continuous manner at a speed of 50 yd/min. to the nip of a flame laminating machine. At this point it was contacted with a second polyester urethane foam 1.25 mm. thick, having 50 cells/in. whose surface had been rendered tacky by passing it through a gas flame whose temperature was 1150° C. The burner was again angled upwards at 30° to the horizontal. A reinforcement interlayer was sandwiched continuously between the two foams during the lamination and consisted of an extruded oriented polypropylene net having 80 strands/linear meter. The resultant lamination could not be reversed even after soaking in water due to the strength of the bond produced, and the germination rate after 20 days exceeded 90%.

EXAMPLE 7

Example 6 was repeated using a seed carrier a reticulated polyester urethane foam 1.0 mm. thick having 55 cells/in. The second foam was a similarly reticulated polyester foam 1.25 mm. thick having 55 cells/in. Once again a strong bond and a high germination rate were achieved.

EXAMPLE 8

Example 6 was repeated using a hydrophilic polyester urethane foam 4 mm. thick having 55 cells/in. as seed carrier, and a polyester urethane foam 1.0 mm. thick having 55 cells/in. Similar results were achieved.

In use of the laminated product it is pinned or otherwise secured to the ground in the position of use and the seeds germinate and grow through the surrounding sheets. Normally the laminated product will simply be placed on the surface of the desired growth site, but in some instances it may be covered with a thin layer of soil if required. Where the reinforcing net material is incorporated this enables secure attachment of the sheet in the intended position of use.

The arrangements described possess substantial advantages compared with conventional artificial growth mediums. A primary advantage arises from the fact that the laminated product may be produced continuously at a relatively high speed. Since the seeds are retained in position between the laminated sheets and the latter are flexible the product may be stored in rolled or folded form and in a dry state without affecting subsequent germination of the seed. The laminated product may therefore be transported over long distances in a dry readily manageable state. Moreover the nature of the foam plastic sheets is such that they may be compressed when in roll form using conventional roll compressing equipment to produce compacted low volume rolls for shipping or other transport purposes. It may be necessary in cases where such compaction is required to select the reinforcement net material to avoid damage to the foam plastic sheets in the compressed form. The laminated product may also be stored indefinitely prior to use without requiring to be moistened or otherwise treated.

It should be appreciated that while various modifications have been described above other modifications may be affected within the scope of the invention and wide variations in the type, thickness, cell size and structure of the foam, in the speed of travel, pressures and temperatures applied during bonding may be affected.

We claim:

1. A process for the production of a seeded artificial growth medium comprising continuously feeding a flexible carrier sheet, applying seeds to the upper surface of the continuously moving sheet, moving a sheet of flexible foamed plastics material in synchronism with said carrier sheet, bringing aid sheet of foamed plastics material into juxtaposition with the upper surface of said carrier sheet after application of said seeds thereto, and continuously adhering the sheets together by fusion.

2. A process according to claim 1, wherein said sheets are fused together by flame lamination.

3. A process according to claim 2 wherein the flame is brought into contact with the surface of said foam plastics sheet before the latter is brought into juxtaposition with the carrier sheet.

4. A process according to claim 2 or 3 wherein the flame temperature is between 1100° C. and 1250° C.

5. A process according to claim 2 or 3 wherein said carrier sheet is moved at a speed in excess of 30 yds/min.

6. A process according to claim 1, 2, or 3 wherein said carrier sheet comprises a non-woven fibrous material.

7. A process according to claim 1 wherein said carrier sheet comprises a sheet of foamed plastics material.

8. A process according to claim 1, 2, or 7 wherein a reinforcing material in the form of a net-like structure is incorporated between the two sheets of material.

9. A process according to claim 8 wherein said reinforcing material comprises a net formed from synthetic plastics material and of a mesh size sufficiently large to permit the sheet materials to contact one another between the meshes of the net to retain the integrity of the bond therebetween.

10. A seeded artificial growth medium produced by the process according to any of claims 1, 2, or 7.

11. A process according to claim 7 wherein said foamed plastics material is an open-celled foam.

12. A process according to claim 11 wherein said foamed plastics material is polyurethane foam.

13. A process according to claim 11 wherein said sheet of plastics foam is between 0.5 mm and 15 mm thick.

14. A process according to claim 11 wherein said sheet of plastics foam is between 1 mm and 2.5 mm thick.

15. A process according to claim 11 wherein said sheet of plastics foam has a cell size of 20–60 cells/in.

16. A process according to claim 11 wherein said sheet of plastics foam has a density of 15–35 kg/m³.

17. Apparatus for the production of an artificial growing medium containing seed, the apparatus including means for continuously feeding a carrier sheet of flexible material, means for applying seed to the surface of the carrier sheet, means for continuously feeding a sheet of flexible foamed plastics material and for bringing same into juxtaposition with the seeded surface of said carrier sheet, and means for continuously adhering the sheets to one another by fusion.

18. Apparatus according to claim 17 wherein said means for adhering the sheets to one another comprises a burner tube extending transversely of the direction of movement of the sheets and serving to direct a flame on to the surface of at least one of said sheets, and means for pressing the sheets together after application of said flame thereto.

19. Apparatus according to claim 18 wherein said burner tube is disposed adjacent to the region at which said sheets are brought into juxtaposition but is tilted so as to direct the flame away from the seeded carrier sheet.

20. Apparatus according to any of claim 19 including means for introducing a reinforcing material of net-like structure between said sheets prior to adhering same to one another.

21. Apparatus according to any of claim 19 wherein said means for delivering seeds on to said carrier sheet comprises a vibratory conveyor device disposed above said carrier sheet and having a discharge opening extending across the width of the carrier sheet.

22. A process according to claim 1 wherein said foamed plastics material is an open-celled foam.

23. A seeded growing medium comprising a pair of sheets of flexible material at least one of which comprises a foamed plastics material, the sheets having seeds entrapped between them and having been adhered together by continuous fusion bonding.

24. A seeded growing medium according to claim 23 wherein both said sheets comprise foamed plastics material and are fused together by flame lamination.

25. A seeded growing medium according to claim 23 wherein one of said sheets is a non-woven fibrous material.

26. A seeded growing medium according to any of claims 23 to 25 wherein said foamed plastics material is an open-cell foam.

27. A seeded growing medium according to claim 26 wherein said foamed plastics material is polyurethane foam.

28. A seeded growing medium according to claim 23 or 24 wherein the or each foam plastics sheet is between 0.5 mm and 15 mm thick.

29. A seeded growing medium according to claim 23 or 24 wherein the or each foam plastics sheet is between 1 mm and 2.5 mm thick.

30. A seeded growing medium according to claim 23 or 24 wherein the or each foam plastics sheet has a cell size of 20–60 cells/in.

31. A seeded growing medium according to claim 23 or 24 wherein the or each foam plastics sheet has a density of 15–35 kg/m³.

32. A seeded growing medium according to claim 23 or 24 wherein a reinforcing material comprising a net-like structure is incorporated between the two sheets.

33. A seeded growing medium according to claim 32 wherein said reinforcing material comprises an open mesh structure formed from synthetic yarn.

* * * * *